United States Patent
Zhou et al.

(10) Patent No.: US 9,231,704 B1
(45) Date of Patent: Jan. 5, 2016

(54) ELECTRICAL MITIGATION OF DML NONLINEARITY FOR HIGH-SPEED OPTICAL INTERCONNECTION

(71) Applicant: Google Inc., Mountain View, CA (US)

(72) Inventors: Xiang Zhou, Los Altos, CA (US); Erji Mao, San Jose, CA (US)

(73) Assignee: Google Inc., Mountain View, CA (US)

( * ) Notice: Subject to any disclaimer, the term of this patent is extended or adjusted under 35 U.S.C. 154(b) by 72 days.

(21) Appl. No.: 14/275,166

(22) Filed: May 12, 2014

(51) Int. Cl.
- *H04B 10/54* (2013.01)
- *H04B 10/50* (2013.01)
- *H04B 10/524* (2013.01)

(52) U.S. Cl.
CPC .................. *H04B 10/504* (2013.01)

(58) Field of Classification Search
CPC ....... H04B 10/50; H04B 10/54; H04B 10/524
USPC .................................................. 398/193–195
See application file for complete search history.

(56) References Cited

U.S. PATENT DOCUMENTS

| | | | | |
|---|---|---|---|---|
| 8,165,465 | B2* | 4/2012 | Tanaka | H04B 10/6971 398/102 |
| 2002/0167693 | A1 | 11/2002 | Vrazel et al. | |
| 2010/0303472 | A1* | 12/2010 | Miller | H01S 5/06832 398/195 |
| 2011/0280582 | A1 | 11/2011 | Piehler | |
| 2012/0045218 | A1* | 2/2012 | Sugawara | H04B 10/58 398/182 |
| 2014/0099116 | A1* | 4/2014 | Bai | H04B 10/532 398/76 |
| 2015/0086215 | A1* | 3/2015 | Chen | H04B 10/2507 398/136 |

OTHER PUBLICATIONS

Ahmed, et al., "Numerical Modeling of Intensity and Phase Noise in Semiconductor Lasers", IEEE Journal of Quantum Electronics, vol. 37, No. 12, Dec. 2001.
Cole, et al., "Higher-Order Modulation for Client Optics", IEEE Communications Magazine, pp. 50-57, Mar. 2013.
Ghiasi, et al., "Investigation of 100GbE Based on PAM-4 and PAM-8", IEEE 802.3bm Task Force, pp. 1-28, Sep. 2012.
Kai et al., "Experimental comparison of pulse amplitude modulation (PAM) and discrete multi-tone (DMT) for short-reach 400-Gbps data communication", Optical Communication (ECOC 2013), 39th European Conference and Exhibition on IET, 2013.
Wei, et al., "Comparison of 100 Gb/s Ethernet Links using PAM-8, Multipulse, and Hybrid CAP-16/QAM-16 Modulation Schemes", (2013): 747-749.

* cited by examiner

*Primary Examiner* — Dalzid Singh
(74) *Attorney, Agent, or Firm* — Edward A. Gordon; Foley & Lardner LLP

(57) ABSTRACT

In some implementations, the output of a directly modulated laser (DML) includes nonlinearities with respect to the input signal driving the DML. When the DML is transmitting an amplitude modulated signal, the nonlinearities can induce noise into the signal, which makes it difficult for a receiving node to correctly decode the received signal. The system and methods described herein pre-correct the error caused by the nonlinearities of the DML by filtering (or pre-correcting) the data signal that drives the DML.

20 Claims, 4 Drawing Sheets

ELECTRICAL MITIGATION OF DML NONLINEARITY FOR HIGH-SPEED OPTICAL INTERCONNECTION

BACKGROUND OF THE DISCLOSURE

Nodes within datacenters can communicate through fiber optic networks. In some implementations, data is transmitted over the fiber optic networks with directly modulated lasers (DML). DMLs can be low cost, have a low power consumption, and have a small footprint. However, the DMLs can experience bandwidth and nonlinearity limitations at some data rates.

SUMMARY OF THE DISCLOSURE

According to one aspect of the disclosure a method for pre-correcting the distortion of a directly modulated laser includes providing a plurality of pre-equalization functions. Each of the plurality of pre-equalization functions includes a transfer function. Each of the transfer functions is configured to filter a different amplitude range of an input signal. The method also includes receiving a signal and decomposing the signal into a plurality of sub-signals. Each of the plurality of sub-signals is filtered with one of the plurality of pre-equalization functions. The filtered plurality of sub-signals are combined to generate a corrected signal. The corrected signal is then used to drive the laser.

According to another aspect of the disclosure a system for pre-correcting the distortion of a directly modulated laser includes an amplitude filter configured to decompose an input signal into a plurality of sub-signals. The system also includes a plurality of pre-equalization functions. Each of the plurality of pre-equalization functions has a transfer function configured to filter one of the plurality of sub-signals. The system also includes a combiner configured to sum the filtered plurality of sub-signals to generate a corrected signal. The system also includes a laser driven by the corrected signal.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

In some implementations, the output of a directly modulated laser (DML) includes nonlinearities with respect to the input signal driving the DML. When the DML is transmitting an amplitude modulated signal, the nonlinearities can induce noise into the signal, which makes it difficult for a receiving node to correctly decode the received signal. The system and methods described herein pre-correct the error caused by the nonlinearities of the DML by filtering (or pre-correcting) the data signal that drives the DML.

Figure 1:
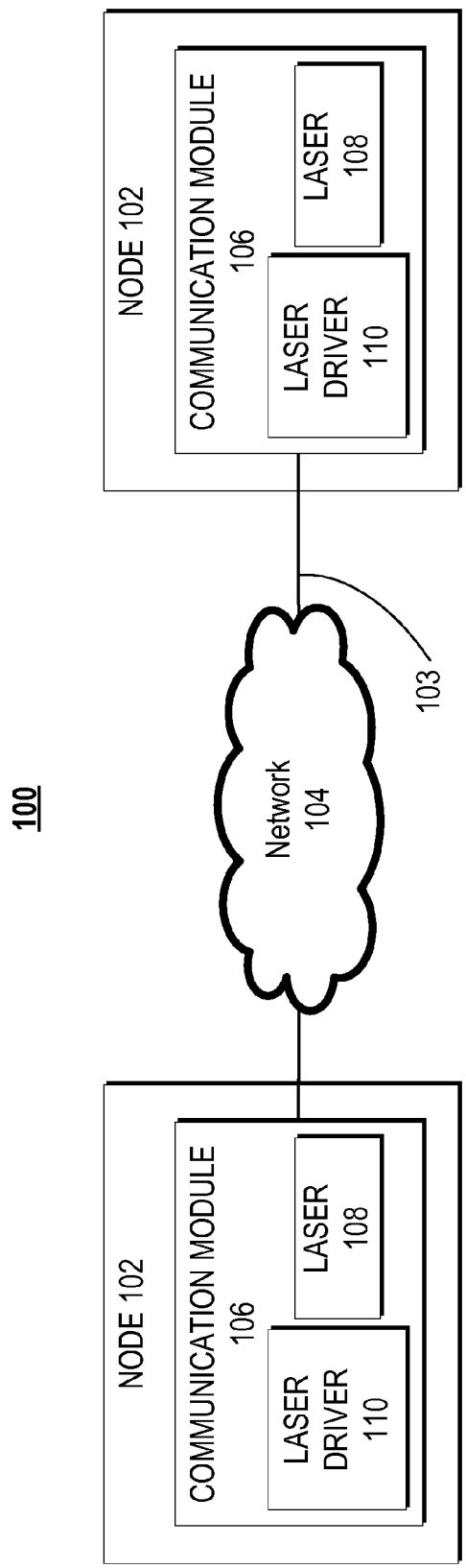
FIG. 1 illustrates an example network.

FIG. 1 illustrates an example system 100. The system 100 includes nodes 102 connected with one another through a network 104. Each of the nodes 102 includes an optical communication module 106. Each optical communication module 106 includes a laser driver 110, which drives a laser 108. The nodes 102 are connected to the network 104 through the optical fibers 103.

As illustrated in FIG. 1, the network includes two nodes 102. In some implementations, the system 100 includes more than two nodes 102. For example, the system may include hundreds, thousands, or tens of thousands of nodes 102. The nodes 102 can be computers, servers, routers, switches, or a combination thereof. In some implementations, the nodes 102 can include any device, which communicate with another device, or which routes or switches data packets between such devices over an optical network.

The nodes 102 communicate over a network 104. In some implementations, the network 104 is a local area network, wide area network, or any other network that includes fiber optic links 103. In some implementations, the network 104 is a network within a datacenter.

Each of the nodes 102 of the system 100 includes an optical communication module 106. The optical communication module 106 converts a digital signal from a node 102 into an optical signal for transmission over the optical fibers 103 to a second node 102. In some implementations, the optical communication module 106 is a component of each of the nodes 102 and in other implementations the optical communication module 106 is located external to the nodes 102. The components of the optical communication module 106 are discussed in greater detail below, but generally, the laser 108 of the optical communication module 106 is a directly modulated laser. The laser driver 110 of the optical communication module 106 receives a data signal to transmit to a second node 102. In some implementations, the optical communication module 106 receives (or converts a received signal) into a pulse-amplitude modulated (PAM) signal. The laser driver 110 receives an input signal from one of the nodes 102 and drives the laser 108 responsive to the received input signal. The PAM signal modulates the current input to the laser 108. Varying the current input to the laser varies the intensity of the laser output. In some implementations, the intensity is modulated between a predetermined number of levels (e.g., a PAM4 signal includes a signal modulated to 4 different levels). The receiving optical communication module 106 converts the received light signal back into an electrical PAM signal. In some implementations, the relationship between the current input to the laser 108 and the intensity of the light output from the laser 108 is nonlinear. In some implementations, the laser driver 110 is configured to correct for the nonlinearities that may occur between the input to the laser 108 and the laser output by filtering the input signal to the laser with one or more pre-correction filters. Each of the pre-correction filters implements a transfer function that corrects for the nonlinearity between the input and output of the laser 108. In general a transfer function describes the relationship between the input and output of a system. To reverse the effects of the system on a signal, the inverse of the system's transfer function can be applied to the signal. As described below, each pre-correction filter implements a transfer function that is an inverse transfer function of a predetermined portion of the input signal to the laser 108.

Figure 2:
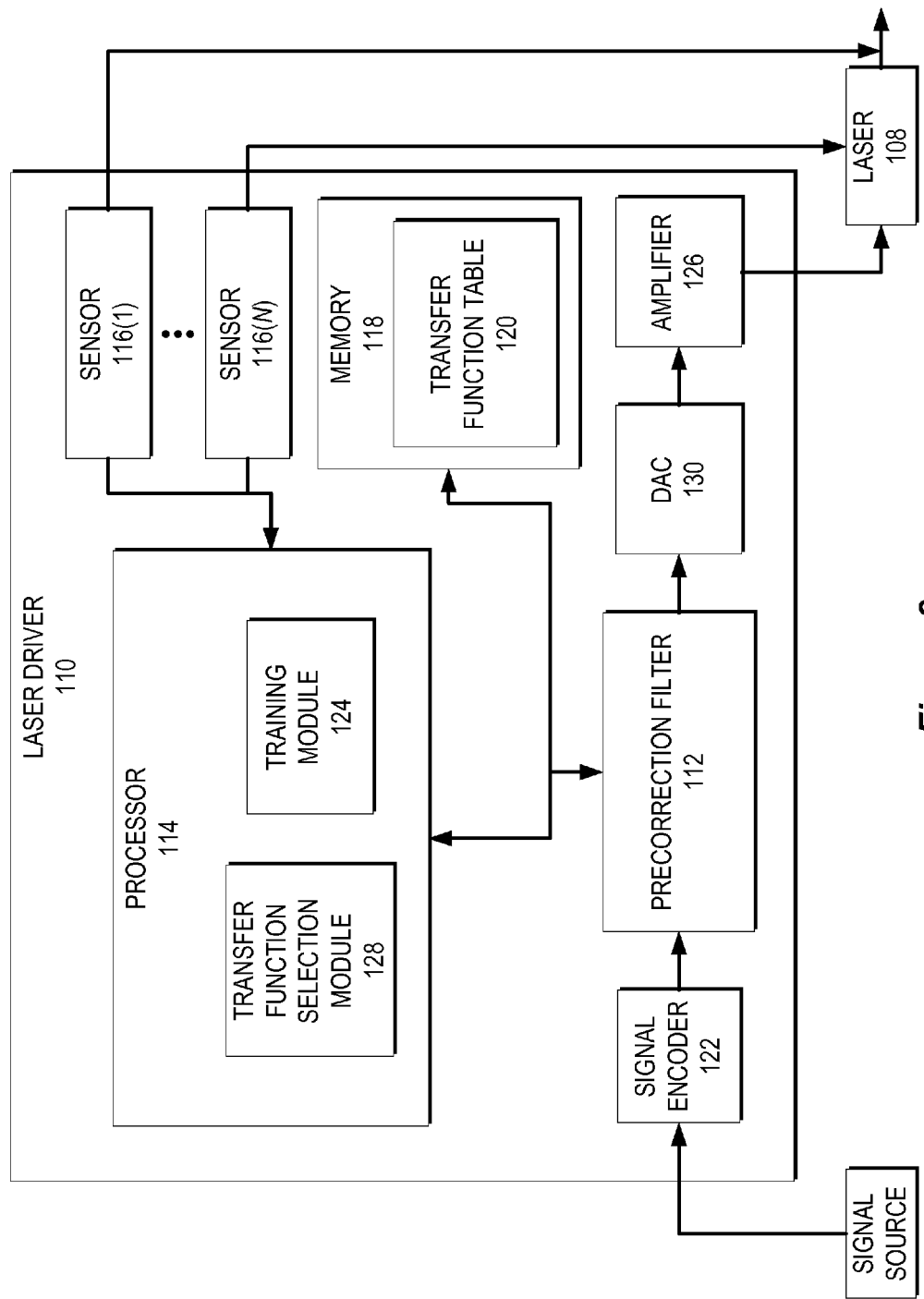
FIG. 2 illustrates an example laser driver that may be used in the example network of FIG. 1.

FIG. 2 illustrates an example laser driver 110. The laser driver 110 includes a pre-correction filter 112. The laser driver 110 also includes a processor 114. The processor 114 measures various environmental and system parameters via a plurality of sensors 116(1)-116(N) (collectively referred to as sensors 116). The processor 114 provides transfer functions to the pre-correction filter 112 from a transfer function table 120 based in part on the sensed parameters. The transfer function table 120 is stored in memory 118. The transfer functions provided to the pre-correction filter 112 are selected by the transfer function selection module 128. The laser driver 110 also includes a training module 124 for creating and modifying the transfer functions stored in the transfer function table 120. The output of the pre-correction filter 112 is passed to a digital-to-analog converter (DAC) 130 and then to an amplifier 126.

The laser driver 110 includes a pre-correction filter 112. The pre-correction filter 112 is described in greater detail below in relation to FIG. 3. Briefly, in some implementations, directly modulated lasers have bandwidth and nonlinearity problems as the data rates increases. For example, as the data rate increases it becomes difficult for the laser 108 to cleanly switch between the various light output levels of the PAM signal. When quickly switching between the different levels of the PAM signal, the laser 108 may generate an output that is half-way between two of the PAM levels. When the receiving optical communication module 106 receives signal, the receiving optical communication module 106 may not know to which level the signal belongs, and may thus incorrectly re-encode the signal. The problem may become more severe in highly modulated PAM signals (e.g., PAM8). In some implementations, the laser's output may be effected by environmental and system variables such as temperature. The pre-correction filter 112 filters the input signal to the laser driver 110 such that the laser 108 can more accurately output the data signal.

The laser driver 110 also includes a signal encoder 122. The signal encoder 122 receives a signal to correct from the signal source and converts the received signal into the format proper for the pre-correction filter 112. For example, the signal encoder 122 may receive a signal in a binary format and then convert the signal into a PAM4 analog signal. In some implementations, the laser driver 110 receives the signal from the signal source in the proper format and the laser driver 110 does not encode the signal with the signal encoder 122. In these implementations, the signal may pass straight through the signal encoder 122 without being re-encoded or the laser driver 110 may not include a signal encoder 122.

In some implementations, the pre-correction filter 112 is implemented in a digital signal processor (DSP). The pre-correction filter 112 receives a digital signal as input. The digital signal includes digital representations of the signal magnitudes that are to be output to the laser over time. The pre-correction filter 112 then pre-corrects the received digital signal using computer executable instructions stored by the DSP to obtain new output magnitude values. In such implementations, the laser driver 110 includes a DAC 130, which converts the resulting stream of magnitude values signal into an analog signal that is used to drive the laser 108. In some implementations, the signal coming out of the DAC 130 is amplified by an amplifier 126. For example, the amplifier 126 may amplify the current and/or the voltage of the signal coming out of the DAC 130, such that the signal is in the proper operating range of the laser 108.

As illustrated in FIG. 2, the laser driver 110 includes a plurality of sensors 116. One or more of the sensors 116 measure the temperature of the laser 108 (e.g., sensor 116(N)). As illustrated, sensor 116 measures the output of the laser 108. The output of the laser 108 is used by the training module 124 to train the transfer functions used by the pre-correction filter 112 once the laser driver 110 is implemented in the system 100. In some implementations, the sensors 116 measure other system and environmental variables that affect the operation of the laser 108 and optical fibers 103. For example, the sensors 116 may also measure humidity, vibration, radiation levels, or a combination thereof. The sensors 116 provide the temperature and other environmental data to the processor 114.

The laser driver 110 also includes a processor 114, which includes a training module 124 and a function selection module 128. The processor 114 provides transfer functions to the pre-correction filter 112 for pre-correcting the input to the laser driver 110. The function selection module 128 determines which transfer function to provide to the filters of the pre-correction filter 112 responsive to the data provided to the processor 114 by the sensors 116. For example, for a first operational temperature range of the laser 108, the processor 114 may provide a first set of transfer functions to the pre-correction filter 112, and for a second temperature range of the laser 108, the processor 114 may provide a second set of transfer functions to the pre-correction filter 112. In some implementations, the processor 114 monitors the output of the laser 108, via a sensor 116, and the input signal into the laser driver 110. The training module 124 may compare the expected output of the laser 108 to the actual output of the laser 108 to train or modify the transfer functions used by the pre-correction filter 112.

The laser driver 110 includes memory 118. In some implementations, the memory 118 is configured to store processor-executable instructions and other data. The memory 118 can include volatile and non-volatile memory, such as, but not limited to, flash memory, random access memory (RAM), programmable read-only memory (e.g., EPROM and EEPROM), mass storage devices (e.g., magnetic, magneto-optical disks, and optical disks), or any combination thereof The function table 120 is stored in the memory 118 of the laser driver 110. The function table 120 includes the plurality of the transfer functions from which the function selection module 128 selects when the processor 114 provides transfer functions to the pre-correction filter 112. In some implementations, the training module 124 adds or modifies the transfer functions stored in the function table 120. In some implementations, the function table 120 is a lookup table that lists a plurality of transfer functions to be used under predetermined circumstances—for example, when the laser 108 is running in a specific temperature range.

In some implementations, the components of the laser driver 110 are implemented in integrated circuit logic (or hardware logical) or as instructions executed by one or more processors. For example, in some implementations, the components of the laser driver 110 are implemented as special purpose logic circuitry, such as application-specific integrated circuits (ASICs), digital signal processors (DSPs), field-programmable gate arrays (FPGAs), or a combination thereof. In implementations where the components of the laser driver 110 are implemented as instructions executed by the processor 114, the processor 114 executes instructions stored in the memory 118. Execution of the instructions stored in the memory 118 causes the processor 114 to perform the methods described herein. For example, the training module 124 may be a series of instructions executed by the processor 114 during a calibration phase of the laser driver 110. In some implementations, some of the components of the laser driver 110 are implemented as programs executed by the processor 114 and some of the component of the laser driver 110 are implemented in hardware logic. For example, the signal encoder 122, pre-correction filter 112, and DAC 130 may be implemented in one or more ASICs, while the training module 124 and the function selection module 128 are implemented as instructions executed by the processor 114. In some implementations, the components of the laser driver 110 that preferably perform at relatively higher speeds (e.g., the pre-correction filter 112) are implemented in hardware logic and the components that need not perform at relatively lower speeds (e.g., the training module 124) are implemented as instructions performed by the processor 114.

Figure 3:
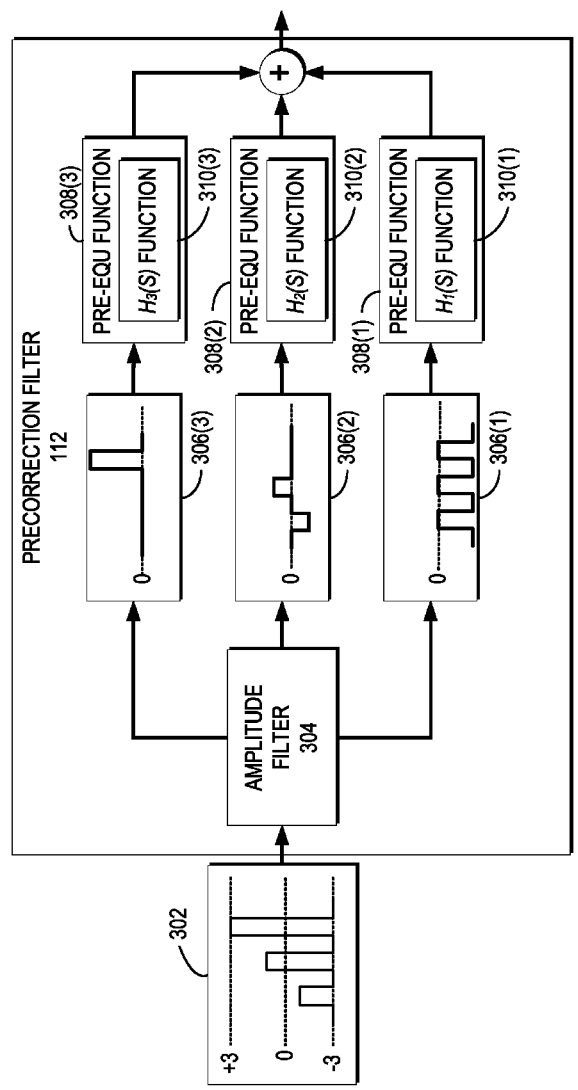
FIG. 3 illustrates an example pre-correction filter for use in the laser driver of FIG. 2.

FIG. 3 illustrates an example pre-correction filter 112 from the laser driver 110. Referring also to FIG. 2, the pre-correction filter 112 receives an input signal 302 and outputs a signal to the laser 108. The output from the pre-correction filter 112 is a current signal that directly determines the intensity of the laser 108 output. The pre-correction filter 112 includes an amplitude filter 304. The amplitude filter 304 decomposes the input signal 302 into a plurality of sub-signals 306(1)-306(3), collectively referred to as sub-signals 306. The pre-correction filter 112 also includes a plurality of pre-equalization functions 308(1)-308(3), collectively referred to as pre-equalization functions 308. Each of the pre-equalization functions 308 includes a transfer function 310.

The pre-correction filter 112 receives an input signal 302. As illustrated, the input signal 302 is a PAM4 signal. The PAM4 signal includes four distinct amplitude levels. In some implementations, the input signal 302 is a PAM8, PAM12, PAM16, etc. In other implementations, the input signal 302 is any signal type that may be decomposed into multiple, amplitude-dependent sub-signals. For example, the input signal 302 can be an analog signal, a discrete multi-tone modulated (DMT) signal, or a carrierless amplitude and phase modulated signal. For frequency modulated signals, such as DMT, the signal is decomposed into a plurality of subcarriers in the frequency domain. The frequency domain signals are transformed into the time domain where each of the resulting signals includes amplitude variations, which may be processed with the pre-correction filter 112.

The pre-correction filter 112 of FIG. 3 includes an amplitude filter 304. The amplitude filter 304 receives the input signal 302 and divides the input signal 302 into a plurality of sub-signals. In some implementations, each of the plurality of sub-signals includes a portion of the original input signal 302 located within a specific amplitude range. In some implementations, the specific amplitude ranges (or bins) by which the input signal 302 is decomposed are of equal size. In other implementations, the bins are of unequal size. For example, regions in which the laser 108 has greater non-linearity may be divided into smaller bins when compared to the regions where the laser 108 has a more linear response to the input signal. In this example, the input signal may be binned into a sufficiently small amplitude ranges, such that within the binned amplitude range the laser 108 acts linearly.

The example amplitude filter 304 of the pre-correction filter 112 decomposes the PAM4 input signal 302 into three sub-signals 306. The PAM4 input signal general includes pulses at the levels of −3, −1, 1, and 3. As illustrated the amplitude filter 304 divides the input signal 302 into a first sub-signal 306(1), which includes the lowest levels (e.g., the −3 level signal component) of the original input signal 302; a second sub-signal 306(2) that includes the middle levels (e.g., the −1 to 1 level signal components) of the input signal 302; and a third sub-signal 306(3) that includes the highest range (e.g., +3 level signal components) of the original input signal 302. The summing of the plurality of sub-signals 306 at this point would reproduce the input signal 302.

The pre-correction filter 112 also includes a plurality of pre-equalization functions 308. Each of the pre-equalization functions 308(1)-308(3) include a transfer function (H(s)) 310(1)-310(3), respectively. As described above, each of the plurality of transfer function 310 are provided to a different one of the respective pre-equalization functions 308 by the processor 114. The transfer functions 310 are linear pre-equalization functions, which pre-correct for the distortion of the laser 108. In some implementations, each of the transfer functions 310 are obtained by measuring a small signal transfer function (SSTF) of the laser 108 at different bias levels. In some implementations, the different bias levels correspond to the amplitude regions into which the amplitude filter 304 decomposes the input signal 302. For example, for the example pre-correction filter 112 illustrated in FIG. 3, the SSTF for the three sub-signals 306(1)-306(3) are measured at a bias level of −3, 0, and +3, respectively. The transfer functions are then the inverse of the SSTF at each of the bias levels. In some implementations, the SSTF is determined by measuring an impulse response at several different pulse amplitude levels for only one of the bias levels—for example, 0. The SSTF for the other bias levels (e.g., −3 and +3) are then calculated using the measured impulse responses from the single bias level. For example, at the +3 bias level, the laser 108 may repeatedly undershoot the +3 level by 15%. In this example, the pre-equalization functions 308(3) may increase amplitude of the sub-signal 306(3); thus, increasing the current associated with the +3 bias level and compensating for the typical undershoot of the laser 108. In some implementations, the output of the laser 108 is responsive to the operating temperature of the laser 108. In these implementations, a different transfer function 310 is loaded into each of the different pre-equalization functions 308 responsive to the current operating temperature of the optical fibers 103. For example, the laser 108 may experience more nonlinearities when operating at a higher temperature range.

Figure 4:
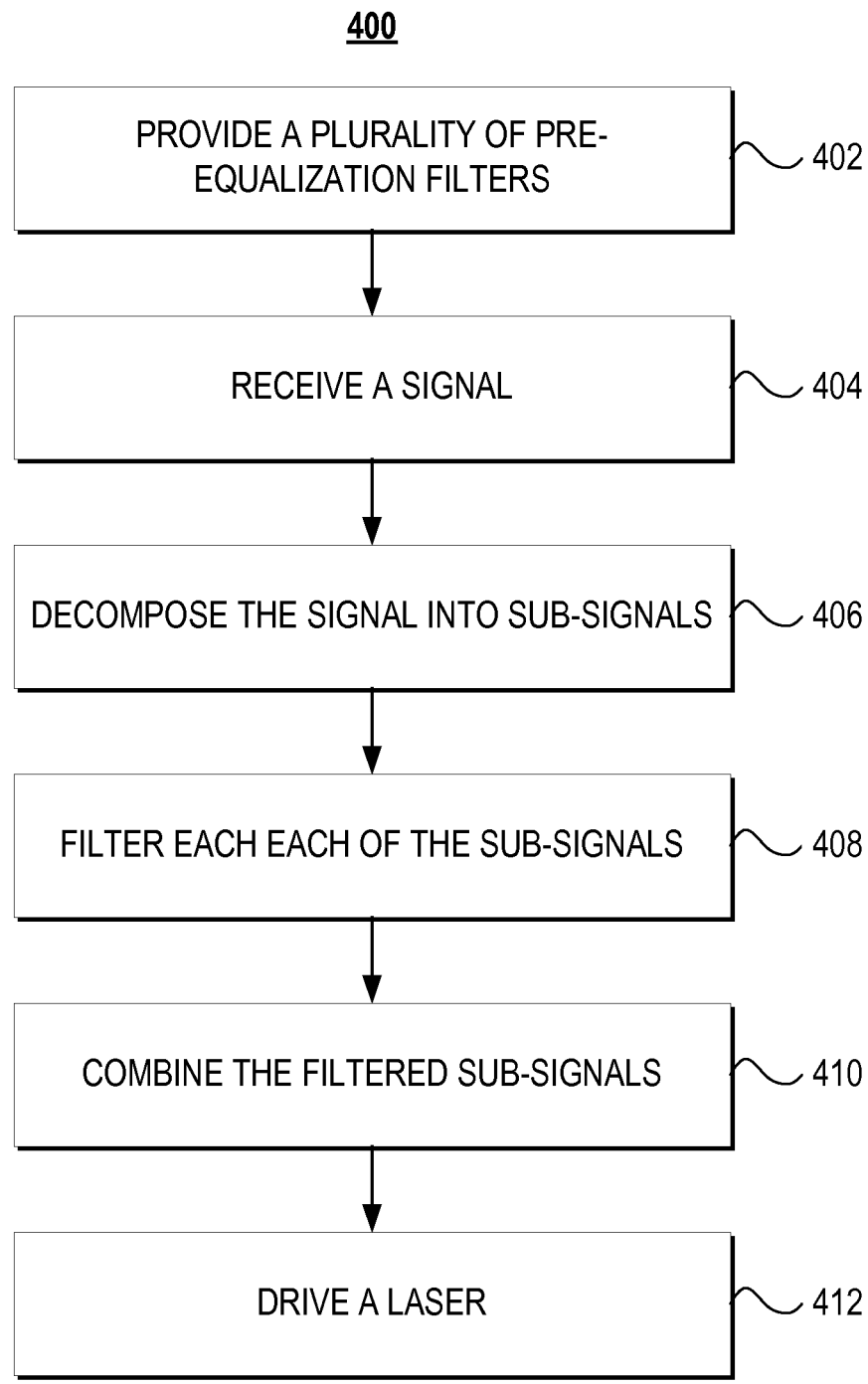
FIG. 4 illustrates a flow chart of an example method of driving a directly modulated laser in the example network of FIG. 1.

FIG. 4 illustrates a flow chart of an example method 400 for driving a directly modulated laser. The method 400 includes providing a plurality of pre-equalization functions (step 402). The method also includes receiving a signal (step 404) and decomposing the signal into a plurality of sub-signals (step 406). Each of the plurality of sub-signals are then filtered (step 408). The sub-signals are combined into a corrected signal (step 410). The directly modulated laser is then driven with the corrected signal (step 412).

As set forth above, the method 400 includes providing a plurality of pre-equalization functions (step 402). In some implementations, the pre-equalization functions implemented as an ASIC within the control circuit of the laser driver driving the laser. Each of the pre-equalization functions includes a transfer function configured to filter different amplitudes of an input signal to the laser. In some implementations, the plurality of transfer functions is trained responsive to the laser to which the laser driver is coupled. For example, during a training phase (or at intermittent periods), the laser driver may monitor the output of the laser and generate the transfer functions responsive to the error in the output, where the error is the difference between the expected output and the actual output. In other implementations, the laser driver may come pre-installed with a plurality of transfer functions, which are trained to a "generic" laser. The generic laser is of the same make and model as the laser to which the laser driver is coupled, but may not have the specific nonlinearities as the actual laser to which the laser driver is coupled. In some implementations, the plurality of transfer functions is designed responsive to a specific operating temperature range of the laser. For example, a first set of transfer functions may be used when the laser is operating in a first temperature range and a second set of transfer functions may be used when the laser is operating in a second temperature range.

The method 400 also includes receiving a signal (step 402). In some implementations, the signal is generated by a node and includes data to be transferred to a second node. The signal is a time-domain signal. In some implementations, the signal is a PAM, DMT, carrierless amplitude and phase modulated signal, or other signal used as input to a directly modulate a DML.

The method 400 includes decomposing the signal into a plurality of sub-signals (step 406). As described above, the laser driver includes a plurality of pre-equalization functions. The amplitude filter within the laser driver decomposes the input signal into multiple, level-dependent sub-signals, one for each of the pre-equalization functions of the laser driver. In some implementations, the input signal is decomposed evenly among each of the sub-signals (e.g., each of the sub-signals includes an equal amount of the amplitude content of the input signal). In other implementations, the sub-signals include an unequal amount of the amplitude content of the input signal. For example, the portion of the input signal that corresponds to the linear response of the laser may be divided among a fewer sub-signals when compared to the amplitudes of the input signal that correspond to the non-linear portion of the laser.

The example method 400 also includes filtering each of the sub-signals (step 408). Also referring to FIG. 3, each of the decomposed sub-signals is routed to a different one of the pre-equalization functions 308 of the pre-correction filter 112. Each of the pre-equalization functions 308 includes a different transfer function 310. Each of the pre-equalization functions 308 correct for the distortions that would occur in the output of the laser, if the input signal was not corrected. Each of the pre-equalization functions 308 correct for the distortions found within the amplitude range of the sub-signal it filters.

In some implementations, the transfer functions of the pre-equalization functions 308 are updated responsive to environmental variables. For example, the processor 114 may detect a change in the operating temperature of the laser and update the transfer functions of the pre-equalization functions 308 responsive to the change in temperature.

The filtered sub-signals are then combined (step 410). The output from each of the pre-equalization functions 308 are combined to create a corrected signal. The outputs from each of the pre-equalization functions 308 are combined in a time-dependent fashion. For example, the output x(t) from each of the pre-equalization functions 308 is combined to generate corrected signal y(t).

The corrected signal is then used to drive the laser (step 412). In implementations, the corrected signal is a current signal that is used to directly drive the laser. In other implementations, the corrected signal drives a current source in the laser driver. The current source, in turn, drives the laser.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method for pre-correcting the distortion of a directly modulated laser, the method comprising:
   providing a plurality of pre-equalization functions, each of the plurality of pre-equalization functions having a transfer function configured to filter a different amplitude range of an input signal;
   receiving a signal;
   decomposing the signal into a plurality of sub-signals;
   filtering each of the plurality of sub-signals with one of the plurality of pre-equalization functions;
   combining the filtered plurality of sub-signals to generate a corrected signal; and
   driving a laser with the corrected signal.

2. The method of claim 1, further comprising updating the transfer function of each of the plurality of pre-equalization functions.

3. The method of claim 1, further comprising updating the transfer function of each of the plurality of pre-equalization functions responsive to a measured temperature of the laser.

4. The method of claim 1, further comprising decomposing the signal responsive to an amplitude of the signal.

5. The method of claim 1, wherein the signal is a pulse amplitude modulated signal.

6. The method of claim 1, further comprising training the transfer functions of each of the plurality of pre-equalization functions responsive to the output of the laser.

7. The method of claim 6, wherein training further comprises measuring a small signal transfer function (SSTF) of the laser at different bias levels and setting the transfer function of each of the plurality of pre-equalization functions responsive to the measured SSTF.

8. The method of claim 7, wherein the transfer function of each of the plurality of pre-equalization is the inverse of the measured SSTF.

9. The method of claim 1, wherein the each of the plurality of sub-signals is filtered with a different one of the plurality of pre-equalization functions.

10. The method of claim 1, further comprising retrieving a second plurality of pre-equalization functions from a lookup table to provide to the plurality of pre-equalization functions.

11. A system for pre-correcting the distortion of a directly modulated laser, the system comprising:
    an amplitude filter configured to decompose an input signal into a plurality of sub-signals;
    a plurality of pre-equalization functions, each of the plurality of pre-equalization functions having a transfer function configured to filter one of the plurality of sub-signals;
    a combiner configured to sum the filtered plurality of sub-signals to generate a corrected signal; and
    a laser driven by the correct signal.

12. The system of claim 11, wherein the transfer functions of each of the plurality of pre-equalization functions are configured to be updated.

13. The system of claim 11, wherein the transfer functions of each of the plurality of pre-equalization functions are updated responsive to a measured temperature of the laser.

14. The system of claim 11, wherein the amplitude filter is configured to decompose the signal responsive to an amplitude of the signal.

15. The system of claim 11, wherein the signal is a pulse amplitude modulated signal.

16. The system of claim 11, wherein the transfer function of each of the plurality of pre-equalization functions is trained responsive to the output of the laser.

17. The system of claim 16, wherein the transfer function of each of the plurality of pre-equalization functions is trained by measuring a small signal transfer function (SSTF) of the laser at different bias levels and setting the transfer function of each of the plurality of pre-equalization functions responsive to the measured SSTF.

18. The system of claim 17, wherein the transfer function of each of the plurality of pre-equalization is the inverse of the measured SSTF.

19. The system of claim 11, wherein the each of the plurality of sub-signals is configured to filter a different one of the plurality of pre-equalization functions.

20. The system of claim 11, further comprising a lookup table configured to store a second plurality of pre-equalization functions.

* * * * *